United States Patent
Bromand et al.

(10) Patent No.: US 11,308,959 B2
(45) Date of Patent: Apr. 19, 2022

(54) DYNAMIC ADJUSTMENT OF WAKE WORD ACCEPTANCE TOLERANCE THRESHOLDS IN VOICE-CONTROLLED DEVICES

(71) Applicant: Spotify AB, Stockholm (SE)

(72) Inventors: Daniel Bromand, Boston, MA (US); Joseph Cauteruccio, Boston, MA (US); Sven Erland Fredrik Lewin, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/787,993

(22) Filed: Feb. 11, 2020

(65) Prior Publication Data
US 2021/0249005 A1    Aug. 12, 2021

(51) Int. Cl.
*G10L 15/22* (2006.01)
*G10L 15/08* (2006.01)
(Continued)

(52) U.S. Cl.
CPC ............. *G10L 15/22* (2013.01); *G10L 15/08* (2013.01); *G10L 15/30* (2013.01);
(Continued)

(58) Field of Classification Search
CPC ......... G10L 15/22; G10L 15/08; G10L 15/30; G10L 15/32; G10L 15/20; G10L 15/02;
(Continued)

(56) References Cited

U.S. PATENT DOCUMENTS 9,319,782 B1    4/2016    Crump et al.
9,361,885 B2    6/2016    Ganong
(Continued)

FOREIGN PATENT DOCUMENTS

CN    108847219 A    11/2018
CN    109286875 A    1/2019
(Continued)

OTHER PUBLICATIONS

Bingham, "A fast fixed-point algorithm for independent component analysis of complex valued signals," Neural Networks Research Centre, Helsinki University of Technology, Finland, Jan. 19, 2000, 16 pgs.
(Continued)

*Primary Examiner* — Yogeshkumar Patel
(74) *Attorney, Agent, or Firm* — Morgan, Lewis & Bockius LLP

(57) ABSTRACT

Systems and methods are provided for detecting wake words. An electronic device detects an audio signal; identifies two spatial zones as first and second sources of audio associated with the audio signal; processes the audio signal at two wake word detection engines, where each detection engine is associated with a respective spatial zone; determines, based on the processing at the wake word detection engines, whether the audio signal represents a wake word for the electronic device; and in accordance with a determination that the audio signal does represent a wake word, adjusts a wake word detection threshold for at least one of the wake word detection engines.

20 Claims, 12 Drawing Sheets

(51) Int. Cl.
  *G10L 15/30* (2013.01)
  *G10L 21/0232* (2013.01)
  *H04R 1/40* (2006.01)
  *H04R 3/00* (2006.01)
  *H04R 5/027* (2006.01)
  *G10L 21/0208* (2013.01)
  *G10L 21/0216* (2013.01)

(52) U.S. Cl.
  CPC .......... *G10L 21/0232* (2013.01); *H04R 1/406* (2013.01); *H04R 3/005* (2013.01); *H04R 5/027* (2013.01); *G10L 2015/088* (2013.01); *G10L 2015/223* (2013.01); *G10L 2021/02082* (2013.01); *G10L 2021/02166* (2013.01)

(58) Field of Classification Search
  CPC ....... G10L 21/0232; G10L 2021/02166; G10L 2021/02082; G10L 2015/088; G10L 2015/223; H04R 5/027; H04R 3/005; H04R 1/406; G06F 3/167
  See application file for complete search history.

(56) References Cited

U.S. PATENT DOCUMENTS

| | | |
|---|---|---|
| 9,431,021 B1 | 8/2016 | Scalise et al. |
| 9,443,527 B1 | 9/2016 | Watanabe |
| 9,640,179 B1 | 5/2017 | Hart et al. |
| 9,734,845 B1 | 8/2017 | Liu et al. |
| 9,779,732 B2 | 10/2017 | Lee |
| 9,779,734 B2 | 10/2017 | Lee |
| 9,794,710 B1 | 10/2017 | Sheen |
| 9,805,733 B2 | 10/2017 | Park |
| 9,916,839 B1 | 3/2018 | Scalise et al. |
| 9,940,949 B1 | 4/2018 | Vitaladevuni et al. |
| 9,947,333 B1 | 4/2018 | David |
| 10,074,371 B1 | 9/2018 | Wang et al. |
| 10,134,388 B1 | 11/2018 | Lilly |
| 10,186,266 B1 | 1/2019 | Devaraj |
| 10,192,546 B1 * | 1/2019 | Piersol ................. G10L 15/08 |
| 10,229,680 B1 | 3/2019 | Gillespie |
| 10,283,116 B2 | 5/2019 | Ko et al. |
| 10,297,266 B1 | 5/2019 | Burenius et al. |
| 10,304,475 B1 | 5/2019 | Wang et al. |
| 10,339,957 B1 | 7/2019 | Chenier |
| 10,365,887 B1 | 7/2019 | Mulherkar |
| 10,445,365 B2 | 10/2019 | Luke |
| 10,515,625 B1 | 12/2019 | Metallinou |
| 10,573,312 B1 | 2/2020 | Thomson |
| 10,600,406 B1 | 3/2020 | Shapiro |
| 10,623,811 B1 | 4/2020 | Cwlk |
| 10,643,609 B1 | 5/2020 | Pogue |
| 10,685,669 B1 | 6/2020 | Lan |
| 10,706,843 B1 | 7/2020 | Elangovan |
| 10,728,196 B2 | 7/2020 | Wang |
| 10,847,149 B1 | 11/2020 | Mok |
| 10,867,596 B2 | 12/2020 | Yoneda |
| 10,878,826 B2 | 12/2020 | Li |
| 2001/0003173 A1 | 6/2001 | Lim |
| 2004/0128135 A1 | 7/2004 | Anastasakos |
| 2011/0046952 A1 | 2/2011 | Koshinaka |
| 2011/0131032 A1 | 6/2011 | Yang |
| 2013/0013315 A1 | 1/2013 | Burke et al. |
| 2014/0149118 A1 | 5/2014 | Lee |
| 2014/0254816 A1 | 9/2014 | Kim et al. |
| 2014/0278372 A1 | 9/2014 | Nakadai |
| 2014/0303969 A1 | 10/2014 | Inose |
| 2014/0334645 A1 | 11/2014 | Yun |
| 2014/0358535 A1 | 12/2014 | Lee |
| 2015/0006176 A1 | 1/2015 | Pogue et al. |
| 2015/0039317 A1 | 2/2015 | Klein |
| 2015/0058018 A1 | 2/2015 | Georges |
| 2015/0162006 A1 | 6/2015 | Kummer |
| 2015/0331666 A1 | 11/2015 | Bucsa et al. |
| 2016/0055850 A1 | 2/2016 | Nakadai |
| 2016/0071526 A1 | 3/2016 | Wingate et al. |
| 2016/0077794 A1 * | 3/2016 | Kim ........................ G06F 3/167 704/275 |
| 2016/0140957 A1 | 5/2016 | Duta |
| 2016/0148615 A1 | 5/2016 | Lee |
| 2016/0217789 A1 | 7/2016 | Lee |
| 2016/0307570 A1 | 10/2016 | Mizumoto et al. |
| 2017/0032244 A1 | 2/2017 | Kurata |
| 2017/0053648 A1 | 2/2017 | Chi |
| 2017/0053650 A1 | 2/2017 | Ogawa |
| 2017/0069321 A1 | 3/2017 | Toiyama |
| 2017/0076720 A1 | 3/2017 | Gopalan |
| 2017/0076726 A1 | 3/2017 | Bae |
| 2017/0090864 A1 | 3/2017 | Jorgovanovic |
| 2017/0103755 A1 | 4/2017 | Jeon |
| 2017/0300990 A1 | 10/2017 | Tanaka |
| 2018/0012593 A1 | 1/2018 | Prasad et al. |
| 2018/0033428 A1 | 2/2018 | Kim |
| 2018/0122378 A1 | 5/2018 | Mixter et al. |
| 2018/0165055 A1 | 6/2018 | Yu et al. |
| 2018/0182383 A1 | 6/2018 | Kim |
| 2018/0182397 A1 | 6/2018 | Carbune |
| 2018/0188948 A1 | 7/2018 | Quyang |
| 2018/0190264 A1 | 7/2018 | Mixter et al. |
| 2018/0211665 A1 | 7/2018 | Park |
| 2018/0211666 A1 | 7/2018 | Kolavennu et al. |
| 2018/0233136 A1 | 8/2018 | Torok et al. |
| 2018/0233137 A1 | 8/2018 | Torok et al. |
| 2018/0233142 A1 | 8/2018 | Koishida |
| 2018/0286394 A1 | 10/2018 | Li |
| 2018/0286414 A1 | 10/2018 | Ravindran |
| 2018/0286433 A1 | 10/2018 | Hicks et al. |
| 2018/0349093 A1 | 12/2018 | McCarty |
| 2019/0051298 A1 | 2/2019 | Lee |
| 2019/0073999 A1 * | 3/2019 | Premont ................. G10L 15/08 |
| 2019/0074014 A1 | 3/2019 | Wilberding |
| 2019/0081810 A1 | 3/2019 | Jung |
| 2019/0087455 A1 | 3/2019 | He |
| 2019/0096419 A1 | 3/2019 | Giacobello |
| 2019/0115018 A1 | 4/2019 | Zurek et al. |
| 2019/0206391 A1 | 7/2019 | Busch |
| 2019/0237067 A1 | 8/2019 | Friedman |
| 2019/0244608 A1 | 8/2019 | Choi |
| 2019/0251960 A1 | 8/2019 | Maker et al. |
| 2019/0295542 A1 | 9/2019 | Huang |
| 2019/0320260 A1 | 10/2019 | Alders et al. |
| 2019/0348044 A1 | 11/2019 | Chun |
| 2019/0355365 A1 | 11/2019 | Kim et al. |
| 2019/0362714 A1 | 11/2019 | Mori |
| 2020/0066271 A1 * | 2/2020 | Li ............................. G10L 15/22 |
| 2020/0074990 A1 | 3/2020 | Kim |
| 2020/0074995 A1 | 3/2020 | Rosenberg |
| 2020/0098354 A1 | 3/2020 | Lin |
| 2020/0105245 A1 | 4/2020 | Gupta |
| 2020/0105264 A1 | 4/2020 | Jang |
| 2020/0211539 A1 | 7/2020 | Lee |
| 2020/0211550 A1 | 7/2020 | Pan |
| 2020/0234709 A1 | 7/2020 | Kunitake |
| 2020/0265838 A1 | 8/2020 | Lee |
| 2020/0310751 A1 | 10/2020 | Anand |
| 2020/0357374 A1 | 11/2020 | Verweij et al. |
| 2020/0367006 A1 | 11/2020 | Beckhardt |
| 2020/0374269 A1 | 11/2020 | Lidman |
| 2020/0402490 A1 | 12/2020 | Duthaler |
| 2021/0067867 A1 | 3/2021 | Kagoshima |

FOREIGN PATENT DOCUMENTS

| | | |
|---|---|---|
| CN | 109741755 A | 5/2019 |
| DK | 201770421 A1 | 12/2018 |
| EP | 2965496 A1 | 1/2016 |
| EP | 2965496 B1 | 1/2018 |
| EP | 3306892 A1 | 4/2018 |
| WO | WO2017/197184 A1 | 11/2017 |
| WO | WO2018/211983 A1 | 11/2018 |
| WO | WO2018/230932 A1 | 12/2018 |

(56) References Cited

FOREIGN PATENT DOCUMENTS

| WO | WO2019034083 A1 | 2/2019 |
| WO | WO2019046173 A1 | 3/2019 |
| WO | WO2019/160787 A1 | 8/2019 |

OTHER PUBLICATIONS

E&T Engineering and Technology, "Amazon proposes bundling multiple virtual assistants in a single device," Sep. 25, 2019, downloaded from https://eandt.theiet.org/content/articles/2019/amazon-proposes-bundling-multiple-virtual-assistnts-in-a-single-device/, 4 pgs.

Saruwatari, "Blind Source Separation Combining Independent Component analysis and Beamforming," EURASIP Journal on Applied Signal Processing 2003:11, 1135-1146, © 2003 Hindawi Publishing Corporation, 12 pgs.

Spotify AB, Extended European Search Report, EP20217407.4, dated Jun. 17, 2021, 9 pgs.

Bromand, Notice of Allowance, U.S. Appl. No. 16/562,318, dated Jun. 29, 2020, 9 pgs.

Bromand, Notice of Allowance, U.S. Appl. No. 16/557,734, dated Apr. 16, 2021, 14 pgs.

Spotify AB, Extended European Search Report, EP20170208.1, dated Oct. 9, 2020, 6 pgs.

Spotify AB, Extended European Search Report, EP20178734.8, dated Nov. 26, 2020, 10 pgs.

Spotify AB, Extended European Search Report, EP20179016.9, dated Aug. 14, 2020, 7 pgs.

Bromand, Office Action, U.S. Appl. No. 16/788,067, dated Sep. 14, 2021, 21 pgs.

\* cited by examiner

Detect θ = 45° 400A
$t_1 > t_2 > t_3$

Detect $\theta = 0°$ 400B
$t_1 = t_2 = t_3$

DYNAMIC ADJUSTMENT OF WAKE WORD
ACCEPTANCE TOLERANCE THRESHOLDS
IN VOICE-CONTROLLED DEVICES

TECHNICAL FIELD

This application relates to processing audio signals in order to detect wake words in environments having multiple audio sources.

BACKGROUND

Voice-controlled devices are typically kept in a low power state until a wake word is detected. Upon detecting a wake word, voice-controlled devices continue to detect voice commands and perform functions based on the detected commands.

In noisy environments with the potential for multiple audio sources, wake words may be difficult to detect due to interference caused by other audio signals. As a result, a voice-controlled device may detect an incorrect voice command or fail to detect the wake word. The ability to detect wake words may further be negatively affected by non voice-based audio sources which can be louder than users' voices, thereby drowning out or further interfering with wake word detection.

In some scenarios, voice-controlled devices may focus on the loudest audio source in the space, whether or not that audio source is a voice. In a car, for example, the microphones of a voice-controlled device are more likely to focus on the automotive loudspeakers, as the volume of the speakers is often higher than the volume of the user's voice.

As such, improvements to conventional techniques for detecting wake words in real-world environments are needed.

SUMMARY

Embodiments of an improved wake word detection system and method are described herein. In some embodiments, a voice-controlled device includes a fixed array of microphones, an audio front end, and a plurality of wake word detection engines. Using the array of microphones, the audio front end scans audio in the environment of the voice-controlled device to detect audio sources. A plurality of wake word detection engines analyze audio signals from the respective audio sources. Each wake word detection engine uses a dynamically adjustable sensitivity threshold to determine whether a respective audio signal includes a wake word. Upon one or more detections of a wake word, sensitivity thresholds for one or more of the plurality of wake word detection engines are adjusted accordingly.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

In accordance with common practice, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, some processes, components, and materials have not been described in exhaustive detail so as not to unnecessarily obscure pertinent aspects of the embodiments described herein.

The systems and methods described herein pertain to detecting wake words in environments which potentially include a plurality of audio sources. These systems and methods improve on prior techniques for detecting wake words by implementing a plurality of detection engines, each associated with a section of the environment, and each configured to use a dynamically adjustable detection sensitivity threshold based on various spatial and temporal factors associated with past detections.

Figure 1:
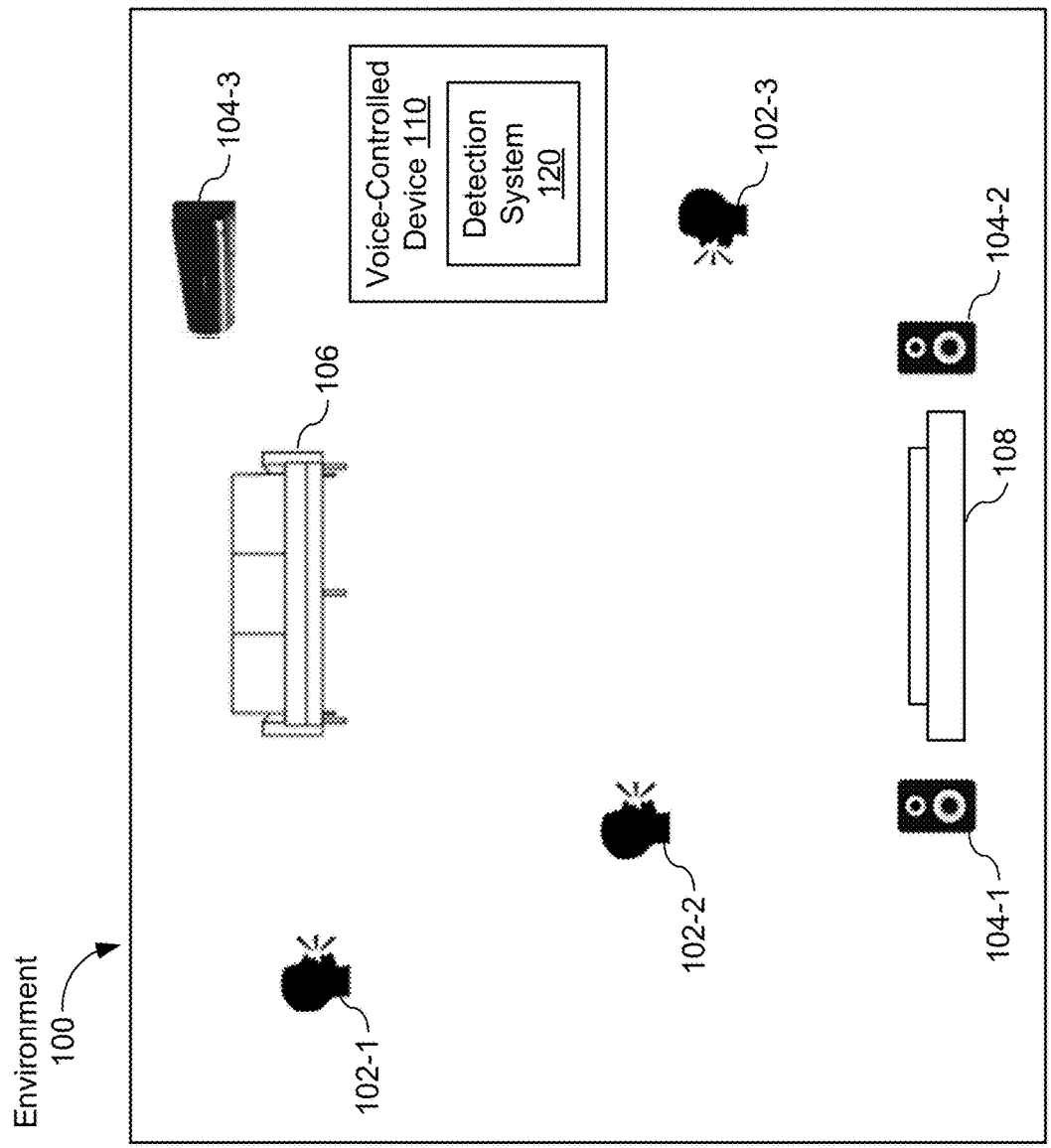
FIG. 1 illustrates an environment of audio sources in accordance with some embodiments.

Referring to FIG. 1, a voice-controlled device 110 is located in an environment 100 with the potential to include a plurality of audio sources. The environment 100 is a space proximate to the voice-controlled device 110. The space may be associated with a structure (e.g., a room in a house or any other type of building, or the interior space of an automobile), or not associated with a structure (e.g., the area proximate to a voice-controlled speaker device located outdoors). In some embodiments, the environment 100 is defined by an area within which a voice-based audio signal is capable of being detected by one or more microphones associated with the voice-controlled device 110.

Sources of detectable audio signals in the environment 100 may include one or more voice-based audio signals 102 (e.g., a person uttering a wake word or voice command) and/or one or more non voice-based audio signals 104 (e.g., speakers outputting audio such as music, a podcast, news, or an audiobook; an air conditioner outputting noise; and so forth). In addition, the environment 100 may include one or more areas 106 associated with a high probability that audio signals coming from the areas are voice-based audio signals (e.g., a couch on which users are likely to be sitting), and/or one or more areas 108 associated with a low probability that audio signals coming from the areas are voice-based audio signals (e.g., a television in front of which a user is unlikely to be standing).

The voice-controlled device 110 includes or is otherwise associated with a detection system 120 configured to detect wake words among one or more voice-based audio sources and/or non voice-based audio sources disposed in the environment 100. The detection system 120 distinguishes wake words from voice-based audio signals which do not include wake words, and from non voice-based audio signals (sometimes referred to herein as noise).

Figure 2A:
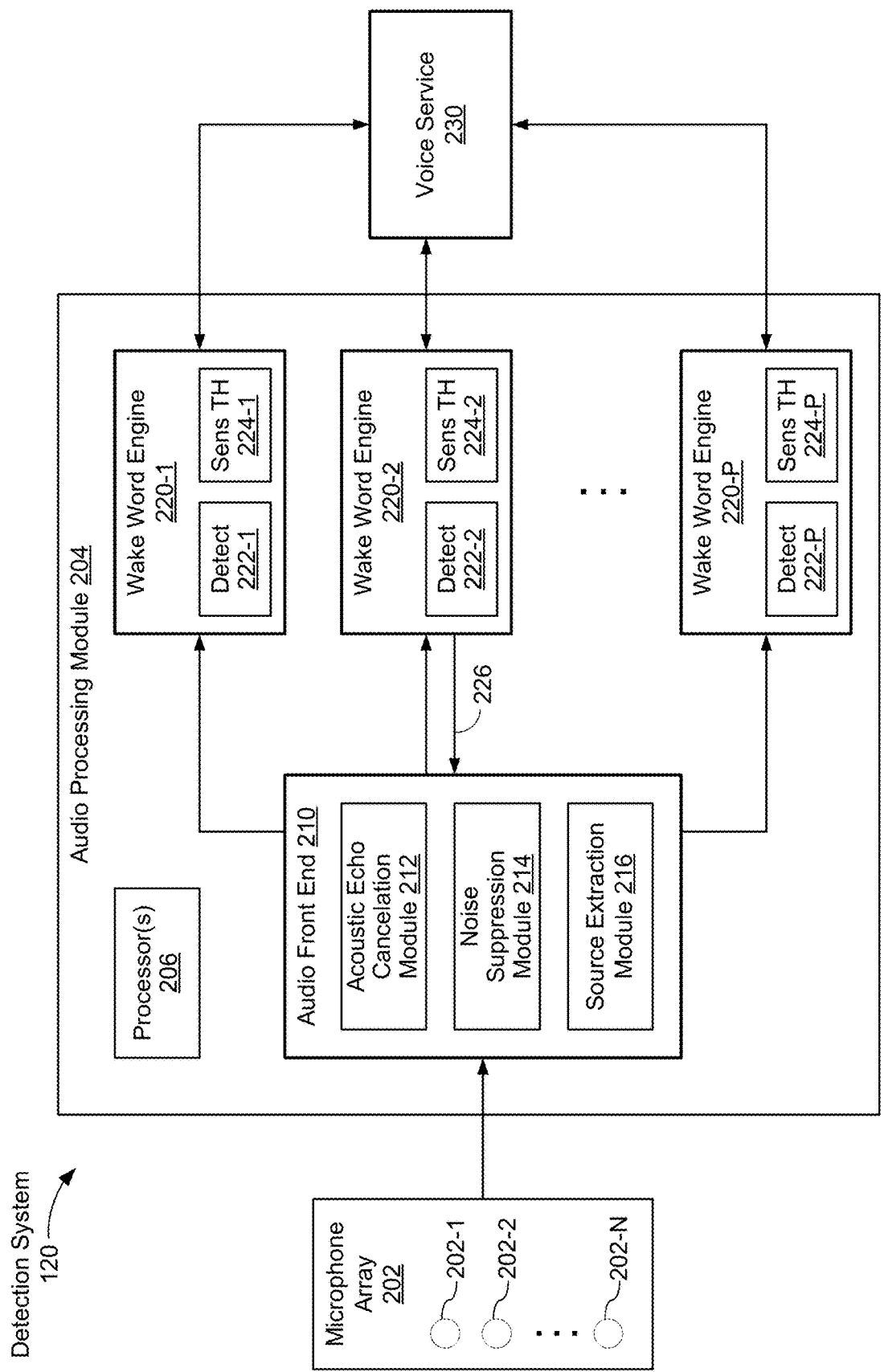
FIGS. 2A-2B are block diagrams of an audio detection system in accordance with some embodiments.
Figure 2B:
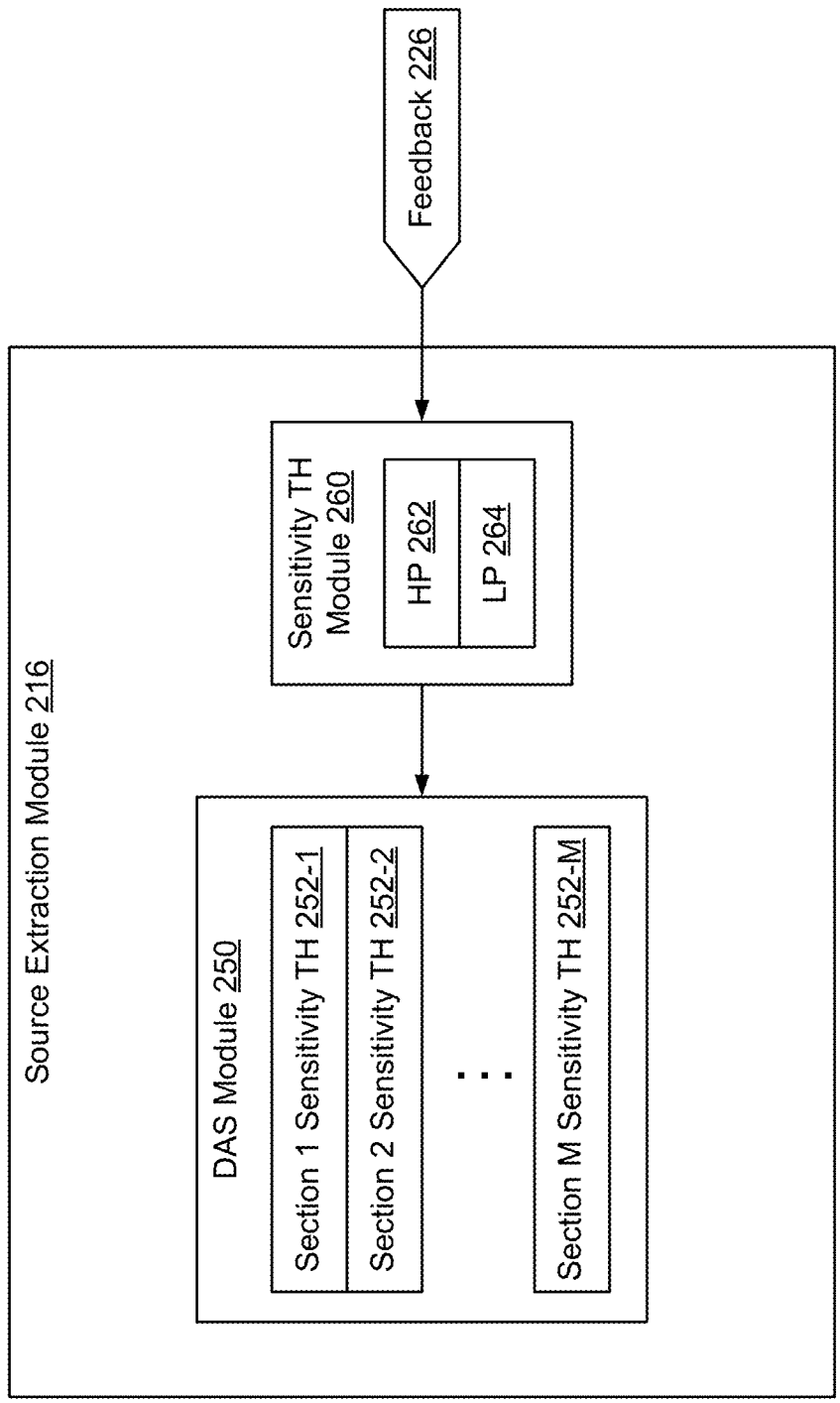

FIGS. 2A and 2B are block diagrams of a detection system 120 in accordance with some embodiments. The example detection system 120 includes a microphone array 202, an audio processing module 204, and a voice service 230.

The microphone array 202 includes at least two microphones. Each microphone is separated by one or more neighbor microphones by a respective distance. The distances between the various microphones in the array cause sound waves from the various audio sources in the environment 100 to arrive at the microphones at different times, even if the sound waves emanate from the same source. The staggered arrival times of the various sound waves allow for the scanning of audio signals and the detection of sources of those audio signals in the environment 100, which is described below with reference to source extraction module 216 and the examples in FIGS. 4A-4D.

The audio processing module 204 includes an audio front end 210 ("AFE"). The AFE 210 includes circuitry and/or software modules configured to clean the audio signals detected by the microphones 202 (e.g., serving as a microphone cleaner). The AFE 210 uses the raw, noisy audio from the microphones 202 to detect, extract, and clean any speech activity found in the ambient sound field surrounding the voice-controlled device 110 (i.e., the environment 100). In the event a voice-based audio signal is detected, the AFE outputs a cleaned, reconstructed version of the audio signal.

In some embodiments, the AFE 210 includes an acoustic echo cancelation module 212, which cancels or otherwise dampens background audio (e.g., music or any other type of audio streams being played by the voice-controlled device 110 or any other device in the environment 100) from the audio streams being detected by the microphones 202. Stated another way, the echo cancelation module 212 removes echo effects caused by the background audio while the AFE 210 captures speech. For example, if the voice-controlled device 110 is playing music, then the AFE 210 uses what is being played to cancel the audio that comes into the microphones 202, which creates cleaner input audio signals.

In some embodiments, the AFE 210 includes a noise suppression module 214 for suppressing noise (e.g., from an air conditioner or any other non voice-based audio source 104). The noise suppression module 214 may suppress noise on a frequency level (e.g., using one or more high pass, low pass, and/or band pass filters), and/or by using one or more noise suppression models.

In some embodiments, the AFE 210 includes a source extraction module 216, which extracts audio signals (from various audio sources) detected by the microphones 202. The source extraction module 216 compensates for the distance between microphones 202 by aligning the audio signals based on the amount of distance separating the microphones. In some embodiments, the source extraction module 216 includes a delay-and-sum (DAS) module 250 (FIG. 2B) configured to perform source extraction operations on audio signals detected by the microphones 202. In some embodiments, the DAS module uses a plurality of sensitivity thresholds 252 corresponding to a plurality of angular sections (also referred to herein as zones) of the environment 100. In some embodiments, the source extraction module 216 also includes a sensitivity threshold module 260 configured to calculate and adjust the sensitivity thresholds 252 based at least in part on high probability (HP) detection data 262 (associated with wake word detection feedback 226) and low probability (LP) detection data 264 (associated with noise detection feedback 226, or a lack of detection feedback 226). The source extraction module 216 and its various operations are described in more detail below with reference to FIGS. 3-8.

The audio processing module 204 includes a plurality of wake word detection engines 220, also referred to herein as wake word engines ("WWE"). The WWEs 220 include circuitry and/or software modules configured to scan the AFE-provided audio streams and detect a specific phrase (e.g., "Hey Spotify!") by determining whether an audio signal corresponding to the phrase is present in the respective audio streams. The accuracy of each WWE is one of the primary drivers of user experience quality, and is dependent upon the purity of the AFE-generated audio streams.

Each WWE 220 uses a distinct instance of processing capabilities of one or more processors 206 in order to analyze an AFE-provided audio signal associated with a particular zone of the environment 100, as described below with reference to FIGS. 3-6. In order to detect a wake word, each WWE 220 includes a detection module 222, configured to detect the wake word using an adjustable sensitivity threshold 224. The level of accuracy required in the wake word detection process is proportional to the sensitivity threshold 224. The sensitivity threshold 224 operates on a spectrum, described in more detail below with reference to FIG. 8. When a particular WWE 220 detects a wake word, the WWE 220 communicates the detection (e.g., by outputting a feedback signal 226) to the AFE 210, which causes the operation thresholds 224 of one or more of the WWEs 220 to be adjusted as a result. In some embodiments, WWEs 220 output feedback (e.g., 226) to the AFE 210 for non-wake word detections as well. The AFE 210 uses the feedback (both the wake word feedback and the non-wake word feedback) to adjust sensitivity thresholds for subsequent detections, as described in more detail below with reference to FIGS. 6 and 7A-7C.

The use of multiple WWEs allows the environment 100 to be broken into sections, and for each section, the separate processing instances associated with the WWEs respond uniquely to audio signals coming from the respective sections due to the different sensitivity thresholds used by each WWE. Breaking the environment into angular sections allows the audio processing module 204 (e.g., the AFE 210) to apply different signal processing steps for a particular section. Further, the WWEs (each serving a particular section of the environment 100) are executed in parallel. Parallel execution of the WWEs allows each WWE to simultaneously analyze audio signals coming from the respective sections, which enables wake word detections which are not only more efficient (due to the parallel execution of each WWE) but also more accurate (due to the unique and adaptively adjustable sensitivity thresholds used by each WWE).

The audio detection system 120 includes or is otherwise communicatively coupled with a voice service 230. The voice service 230 includes circuitry and/or software modules configured to perform automatic speech recognition (ASR) and/or natural language understanding (NLU) in determining user intent associated with wake words and/or voice commands. In some embodiments, the voice service 230 or components thereof are implemented in the voice-controlled device 110. Alternatively, the voice service 230 or components thereof are implemented in a remote server system communicatively coupled with the voice-controlled device 110 over one or more short-range or long-range communication networks (e.g., the Internet). When a WWE 220 detects a wake word, the audio processing module 204 extracts a voice command emanating from the audio source associated with the detected wake word and transmits the voice command to the voice service 230 for further processing (e.g., ASR and/or NLU). In some embodiments, the voice service 230 is further configured to provide feedback to the audio processing module 204 for focusing voice command detection on a particular section of the environment 100 until a respective voice command interaction is complete.

The audio detection system 120 includes one or more processors 206 (central processing units (CPUs)) and memory. In some embodiments, the memory includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. The memory optionally includes one or more storage devices remotely located from the processor(s). In some embodiments, the memory includes a non-transitory computer readable storage medium. In some embodiments, the memory (e.g., the non-transitory computer readable storage medium) stores the modules and data described above with reference to FIGS. 2A and 2B, or a subset or superset thereof. Stated another way, each of the above identified modules and data may be stored in one or more of the previously mentioned memory devices, and each corresponds to a set of instructions for performing a function as described herein. The above identified modules and data (i.e., sets of instructions) need not be implemented as separate software programs, procedures, modules, or data structures, and thus various subsets of these modules and data may be combined or otherwise rearranged in various embodiments. In some embodiments, the memory stores a subset of the modules and data identified above. Furthermore, the memory optionally stores additional modules and data not described above.

Figure 3:
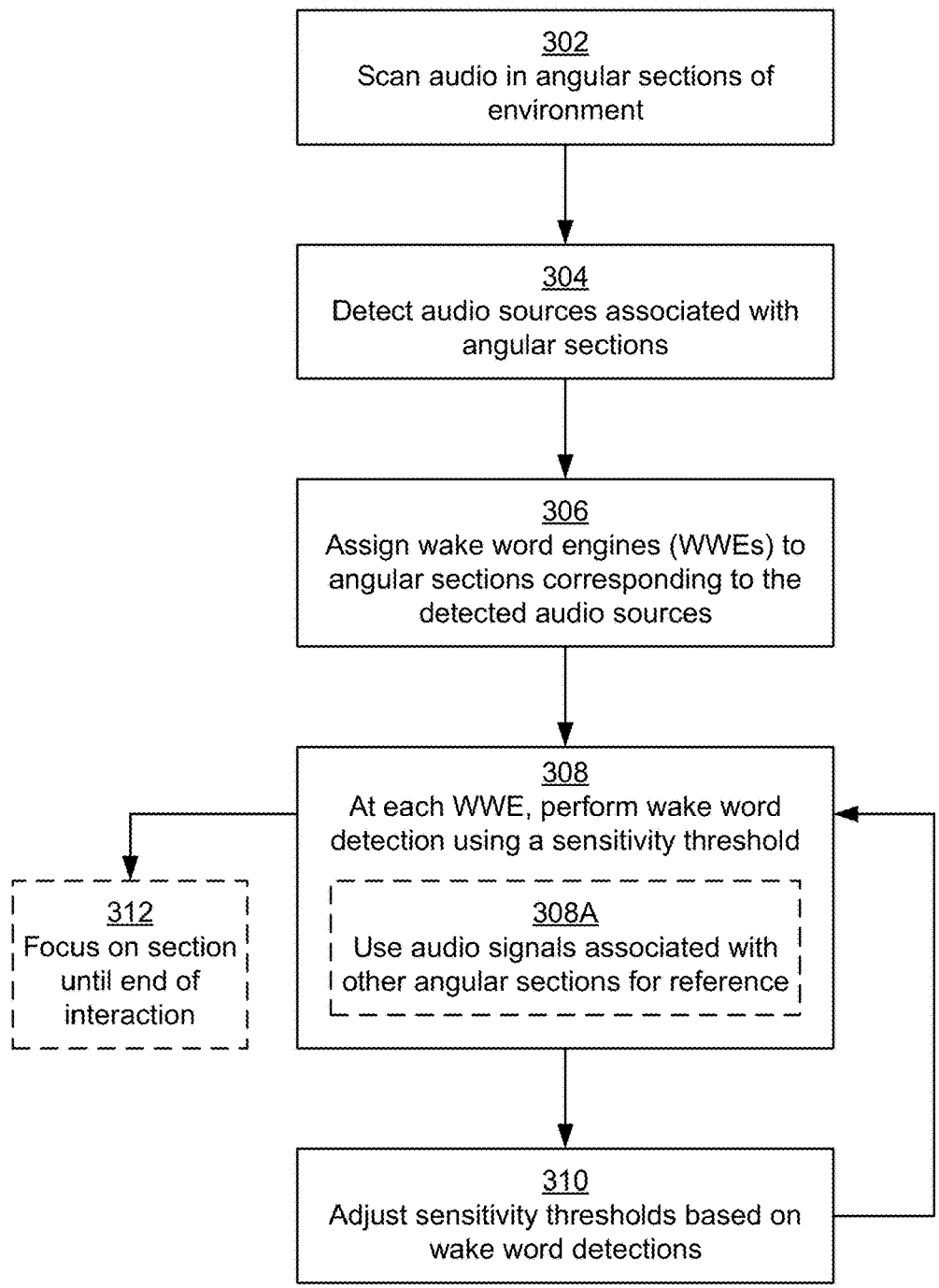
FIG. 3 is a wake word detection process in accordance with some embodiments.

FIG. 3 is a flow diagram of a wake word detection process 300 in accordance with some embodiments. The process may be performed at a detection system 120 having one or more processors and memory storing one or more programs for execution by the one or more processors. In some implementations, the detection system 120 includes one or more programs and memory storing one or more respective programs for execution by the one or more respective processors, and the one or more programs include instructions for performing the process 300. In some implementations, a non-transitory computer readable storage medium stores one or more programs, the one or more programs including instructions which, when executed by a detection system 120 with one or more processors, cause the detection system 120 to perform the process 300.

The detection system 120 scans (302) audio in angular sections of the environment 100. For example, two or more microphones 202 scan audio in 360 degrees around the voice-controlled device 110 and the AFE 210 receives the raw audio data detected by the microphones 202. In some embodiments, AFE 210 divides the 360° space around the voice-controlled device 110 into N angular sections. For example, if N=6, each section includes a 60° slice of the space surrounding the voice-controlled device 110 (with the voice-controlled device 110 being at the center of the space). In some embodiments, each angular section is the same size. Alternatively, one or more angular sections are bigger or smaller than others, depending on the distribution of various audio sources within the environment 100.

The detection system 120 (e.g., source extraction module 216) detects (304) audio sources associated with the angular sections. In some embodiments, the source extraction module 216 detects audio sources by delaying the audio signals received at respective microphones and summing the delayed signals. By applying different combinations of delays and summing the delayed signals for each combination, the source extraction module 216 uses constructive interference to extract and align audio signals coming from respective sources in the environment 100.

FIGS. 4A-4D illustrate the scanning and detecting operations (302 and 304) in accordance with some embodiments. In this example, three audio sources are located in an environment 100. Each audio source outputs an audio signal comprising a plurality of soundwaves which arrive at the microphone array at an angle of incidence θ.

A first audio source outputs sound waves 402*a*, 402*b*, and 402*c*, which arrive as a wavefront 412 at the microphone array 452 at a 45° angle. As such, wave 402*a* arrives first (and is detected by the top microphone), wave 402*b* arrives next (and is detected by the middle microphone), and wave 402*c* arrives last (and is detected by the bottom microphone).

A second audio source outputs sound waves 404*a*, 404*b*, and 404*c*, which arrive as a wavefront 414 at the microphone array 452 at a 0° angle. As such, all three waves 404*a*, 404*b*, and 404*c* arrive (and are detected by respective microphones) at the same time.

A third audio source outputs sound waves 406*a*, 406*b*, and 406*c*, which arrive as a wavefront 416 at the microphone array 52 at a −45° angle. As such, wave 406*c* arrives first (and is detected by the bottom microphone), wave 406*b* arrives next (and is detected by the middle microphone), and wave 406*a* arrives last (and is detected by the top microphone).

In detection settings 400A, 400B, and 400C (FIGS. 4A, 4B, 4C), the source extraction module 216 is configured to detect audio sources at angles of incidence θ=45°, 0°, and −45°, respectively. In order to detect audio sources at a particular angle, the delay-and-sum (DAS) module 250 of the source extraction module 216 applies temporal delays to one or more of the sound waves received at each microphone in the array 452. As used herein, "delay" may refer to a temporal delay greater than or equal to 0 seconds.

To determine whether there is an audio source located a given angle of incidence θ from the microphone array 452, the DAS module 250 calculates delays t for each microphone in the array, based on the distances d between the microphones and their neighbors, and the speed of sound C. Specifically, for a given angle of incidence θ, the DAS module 250 uses the following equation to calculate a delay t to apply to a sound wave received at a particular microphone:

$$t = \frac{d * \sin(\theta)}{C}$$

where t is the amount of delay to apply to the sound wave received at the particular microphone (relative to an amount of delay applied to a sound wave received at the neighboring microphone), d is the distance between the particular microphone and the neighboring microphone, θ is the angle of incidence of the sound waves received at both the particular microphone and the neighboring microphone, and C is the speed of voice in the environment 100 (e.g., 343 m/s in dry air at 20 degrees Celsius).

The source extraction module 216 scans successive angles of incidence θ for audio sources. The increments, in degrees, between successive scans may be chosen to optimize accuracy versus performance. Smaller increments provide greater accuracy at the cost of performance, since each scan involves separate sampling and delay calculations. In some embodiments, the source extraction module 216 scans the environment 100 in increments of 10°, thereby necessitating 36 sets of samples and calculations. The increments may be larger or smaller than 10°, however, based on the desired accuracy versus performance optimizations as described above.

As the source extraction module 216 scans successive angles of incidence θ for audio sources, the DAS module 250 (i) delays (for each angle θ) one or more of the sound waves received at the microphones at a delay module 454 (configured to delay sound waves based on the calculated delays as described above), and (ii) sums the delayed sound waves at a summing module 456 (configured to sum audio waves), resulting in a summed wave 408. The source extraction module 216 then measures the volume of the summed wave 408 (e.g., in dB) and associates the volume data with the given angle of incidence θ. The DAS module 250 delays and sums the sound waves received at the microphones for a plurality of angles of incidence θ spanning the 360° space around the voice-controlled device 110 in environment 100.

Figure 4A:
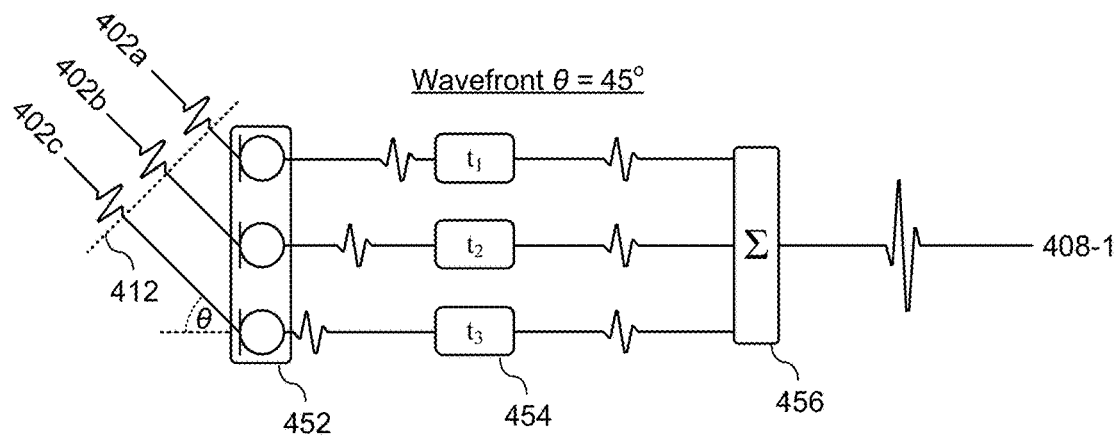
FIGS. 4A-4D illustrate an example source extraction technique in accordance with some embodiments.
Figure 4A:
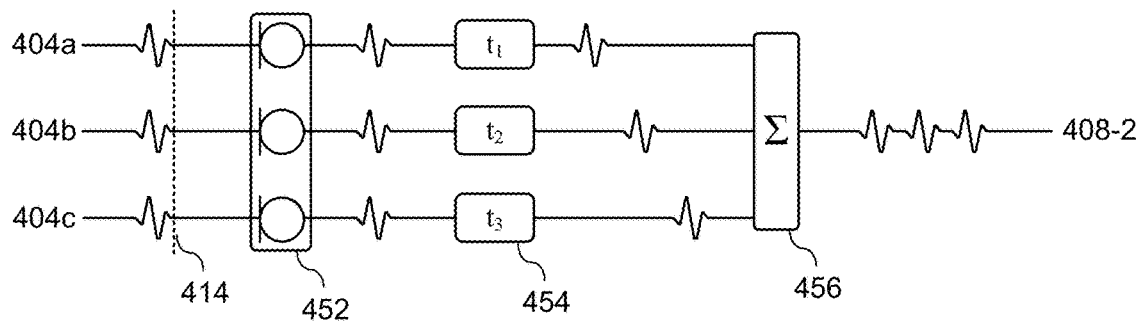
Figure 4A:
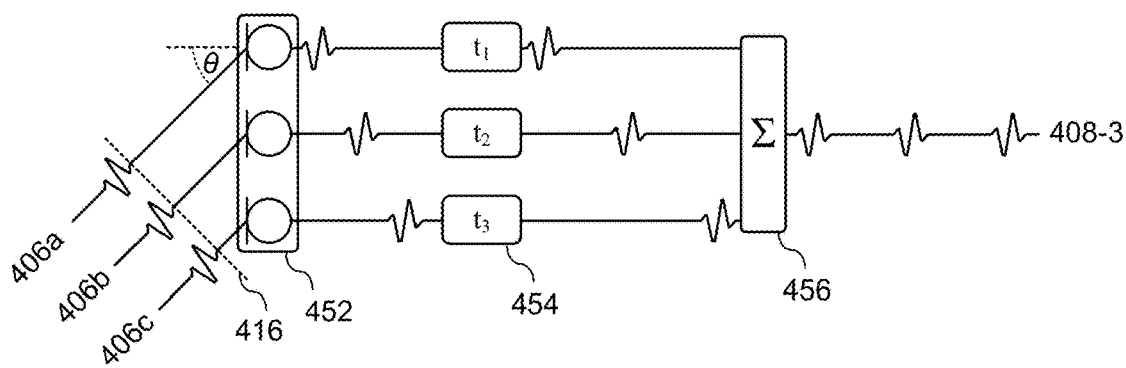
Figure 4B:
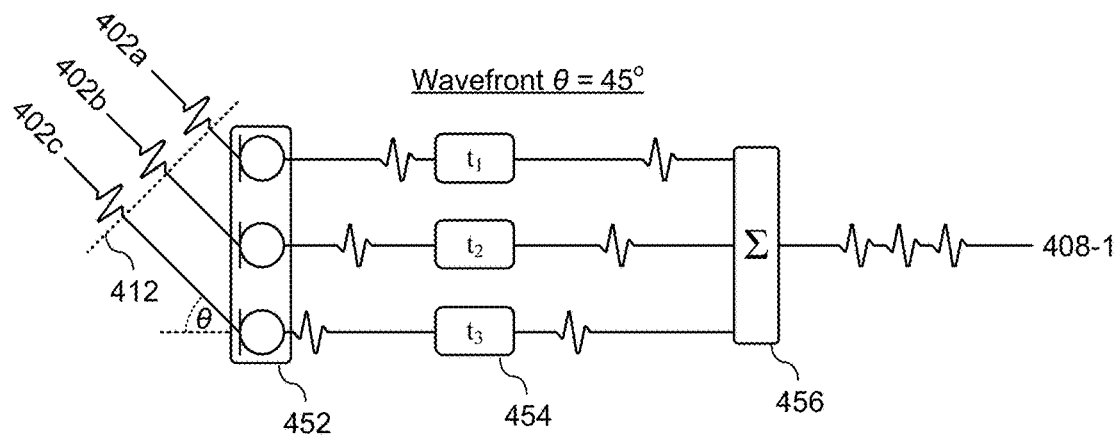
Figure 4B:
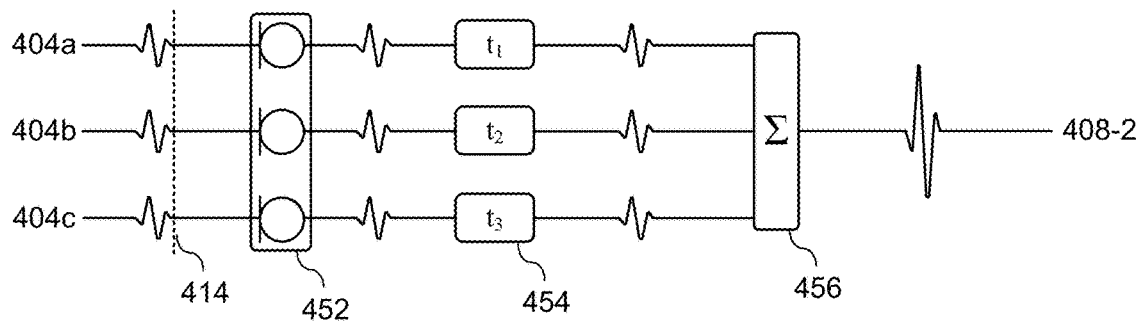
Figure 4B:
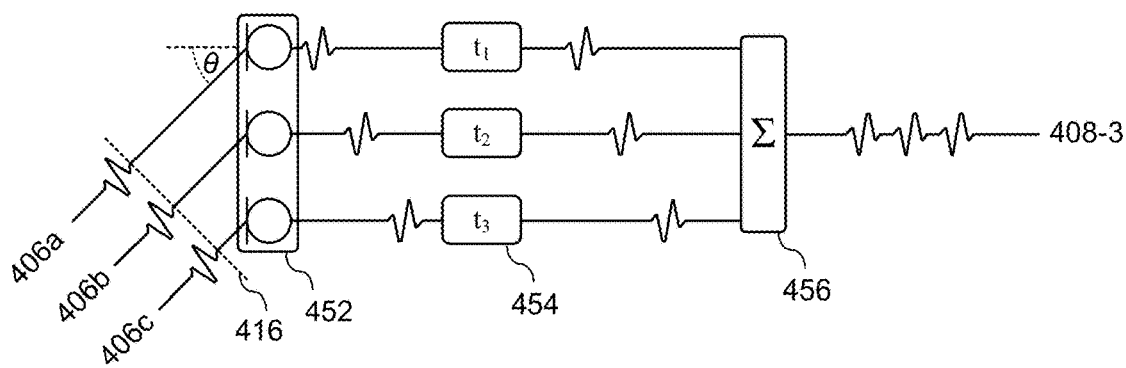
Figure 4C:
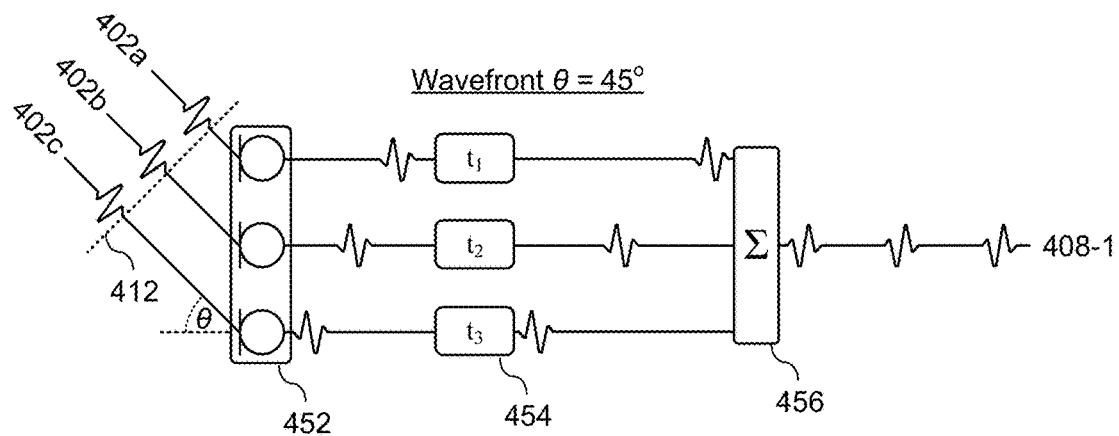
Figure 4C:
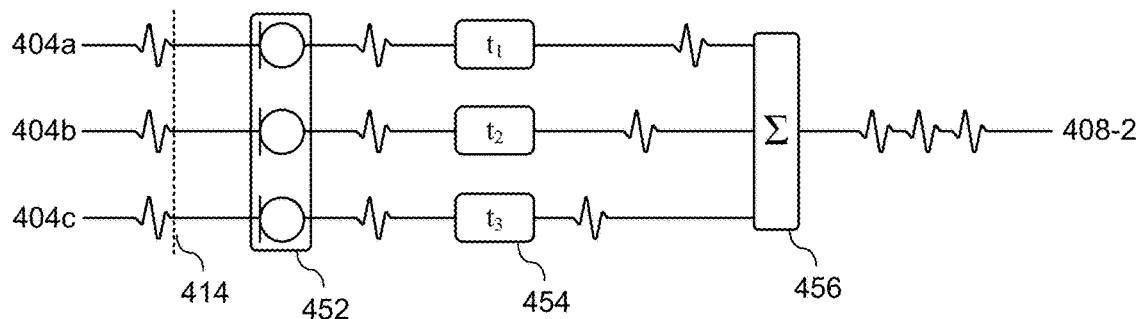
Figure 4C:
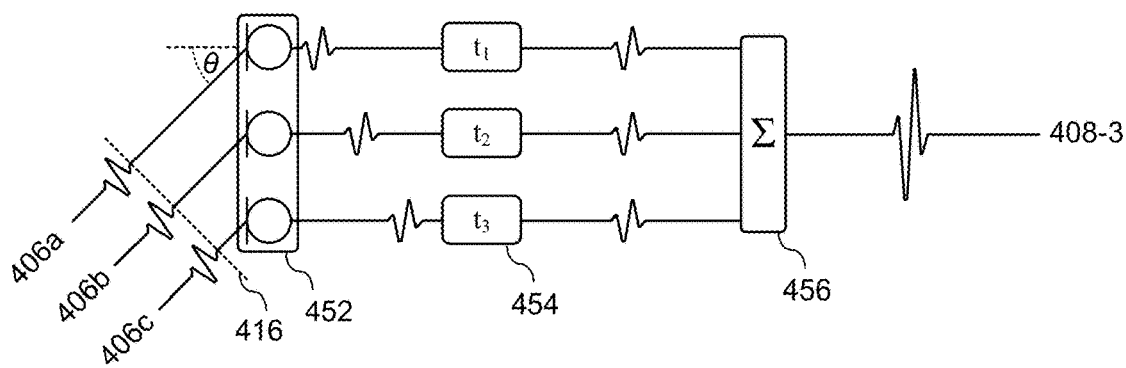

The scenarios 400A-C in FIGS. 4A-4C illustrate the same three groups of sounds waves 402, 404, and 406, arriving at the same microphone array 452. The difference between each scenario is the angular section of the environment 100 in which the DAS module 250 is configured to measure in the context of audio source detection.

At stage 400A (FIG. 4A) of the scanning and detection operations, the DAS module 250 is configured to determine whether sound waves arriving at the microphone array 452 originate in an angular section of the environment associated with an angle of incidence θ=45°. Using the equation above with θ set to 45°, the DAS module 250 configures the delay variables such that $t_1 > t_2 > t_3$. These delay variables cause sound waves emanating from the angular section associated with θ=45° (e.g., wavefront 412) to be aligned after passing the delay stage 454, while sound waves emanating from other angular sections (e.g., wavefronts 414 and 416) are not aligned after passing the delay stage 454. Sound waves that are aligned at the input of the summing module 456 constructively interfere with each other when summed, creating a summed wave with a relatively large amplitude. Conversely, sound waves that are not aligned destructively interfere with each other when summed, creating a summed wave with a relatively small amplitude. As such, the aligned sound waves 402a-c, when summed, create a wave 408-1 with an amplitude that is larger than that of the summed waves 408-2 and 408-3 due to the constructive interference resulting from the delay-caused alignment of the component waves 402a-c and the destructive interference resulting from the delay-caused misalignment (wavefront 414) or delay-enhanced misalignment (wavefront 416) of the component waves 404a-c and 406a-c, respectively.

At stage 400B (FIG. 4B) of the scanning and detection operations, the DAS module 250 is configured to determine whether sound waves arriving at the microphone array 452 originate in an angular section of the environment associated with an angle of incidence θ=0°. Using the equation above with θ set to 0°, the DAS module 250 configures the delay variables such that $t_1 = t_2 = t_3$. These delay variables cause sound waves emanating from the angular section associated with θ=0° (e.g., wavefront 414) to be aligned after passing the delay stage 454, while sound waves emanating from other angular sections (e.g., wavefronts 412 and 416) are not aligned after passing the delay stage 454. As such, the aligned sound waves 404a-c, when summed, create a wave 408-2 with an amplitude that is larger than that of the summed waves 408-1 and 408-3 due to the constructive interference resulting from the alignment of the component waves 404a-c and the destructive interference resulting from the misalignment of the component waves 402a-c and 406a-c.

At stage 400C (FIG. 4C) of the scanning and detection operations, the DAS module 250 is configured to determine whether sound waves arriving at the microphone array 452 originate in an angular section of the environment associated with an angle of incidence θ=−45°. Using the equation above with θ set to −45°, the DAS module 250 configures the delay variables such that $t_1 < t_2 < t_3$. These delay variables cause sound waves emanating from the angular section associated with θ=−45° (e.g., wavefront 416) to be aligned after passing the delay stage 454, while sound waves emanating from other angular sections (e.g., wavefronts 412 and 414) are not aligned after passing the delay stage 454. As such, the aligned sound waves 406a-c, when summed, create a wave 408-3 with an amplitude that is larger than that of the summed waves 408-1 and 408-2 due to the constructive interference resulting from the alignment of the component waves 406a-c and the destructive interference resulting from the misalignment of the component waves 402a-c and 404a-c.

Figure 4D:
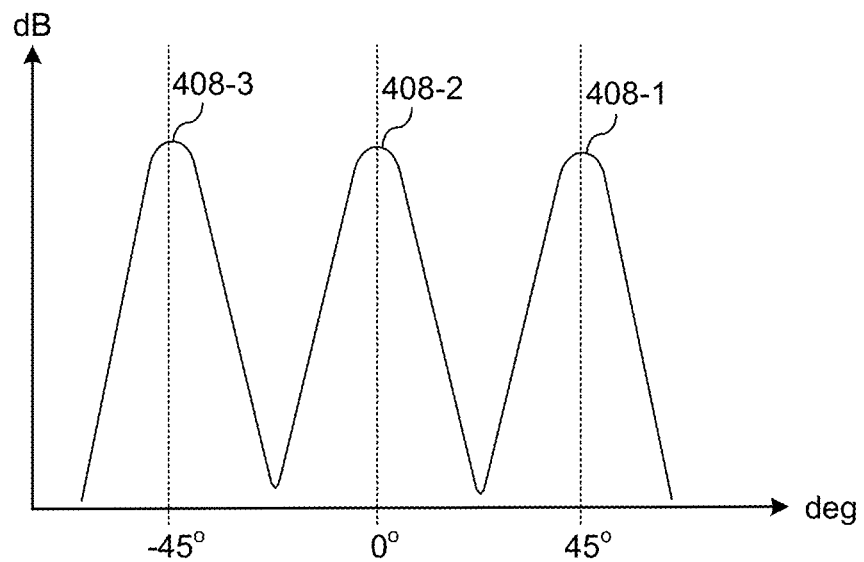

Each of the summed waves 408-1, 408-2, and 408-3 may be plotted on a graph 460 as depicted in FIG. 4D. While the stages illustrated above only include three angles of incidence (−45°, 0°, and 45°), repeating the scanning and detection operations for additional angles would yield a graph similar to graph 460, with amplitude (e.g., measured in dB) representing the volume of a particular audio source, and distribution (e.g., measured in degrees) representing the distribution of sound in the environment 100 caused by a particular audio source.

The source extraction module 216 classifies local volume amplitude maxima as audio sources for the purposes of the detection operation 304 (FIG. 3). Referring to the example graph 460 (FIG. 4D), the extraction module 216 identifies three audio sources in the environment 100, where the three audio sources are located in (or otherwise associated with) −45°, 0°, and 45° angular sections of the environment 100. Stated another way, the final detection results of the AFE 210 are the volume levels at each one of the angular sections. From local peaks in those volume levels, the AFE 210 infers audio sources and associates those audio sources with the angular sections in which they arise.

Returning to the detection process 300 in FIG. 3, upon detecting one or more audio sources associated with angular sections of the environment 100, the audio processing module 204 assigns (306) respective wake word engines (WWEs) to respective angular sections corresponding to the detected audio sources. For example, the source extraction module 216 identifies three audio sources based on sound waves 408-1 (FIG. 4A), 408-2 (FIG. 4B), and 408-3 (FIG. 4C). The audio processing module 204 assigns audio signal 408-1 to a first WWE 220-1, audio signal 408-2 to a second WWE 220-2, and audio signal 408-3 to a third WWE 220-3. By performing the delay and sum operations as described above with reference to FIGS. 4A-4C, the source extraction module 216 can provide cleaner signals to the WWEs (due to the alignment causing constructive interference among the component sound waves), which enables more accurate wake word detections.

Each assigned WWE performs (308) wake word detection operations on its assigned audio signal. Stated another way, each WWE analyzes a summed audio signal representative of an aligned sound wave from a particular audio source. For example, the first WWE 220-1 analyzes sound wave 408-1 (FIG. 4A), the second WWE 220-2 analyzes sound wave 408-2 (FIG. 4B), and the third WWE 220-3 analyzes sound wave 408-3 (FIG. 4C). Each WWE determines if the respective sound wave 408 includes or otherwise represents or corresponds with a wake word.

Figure 5:
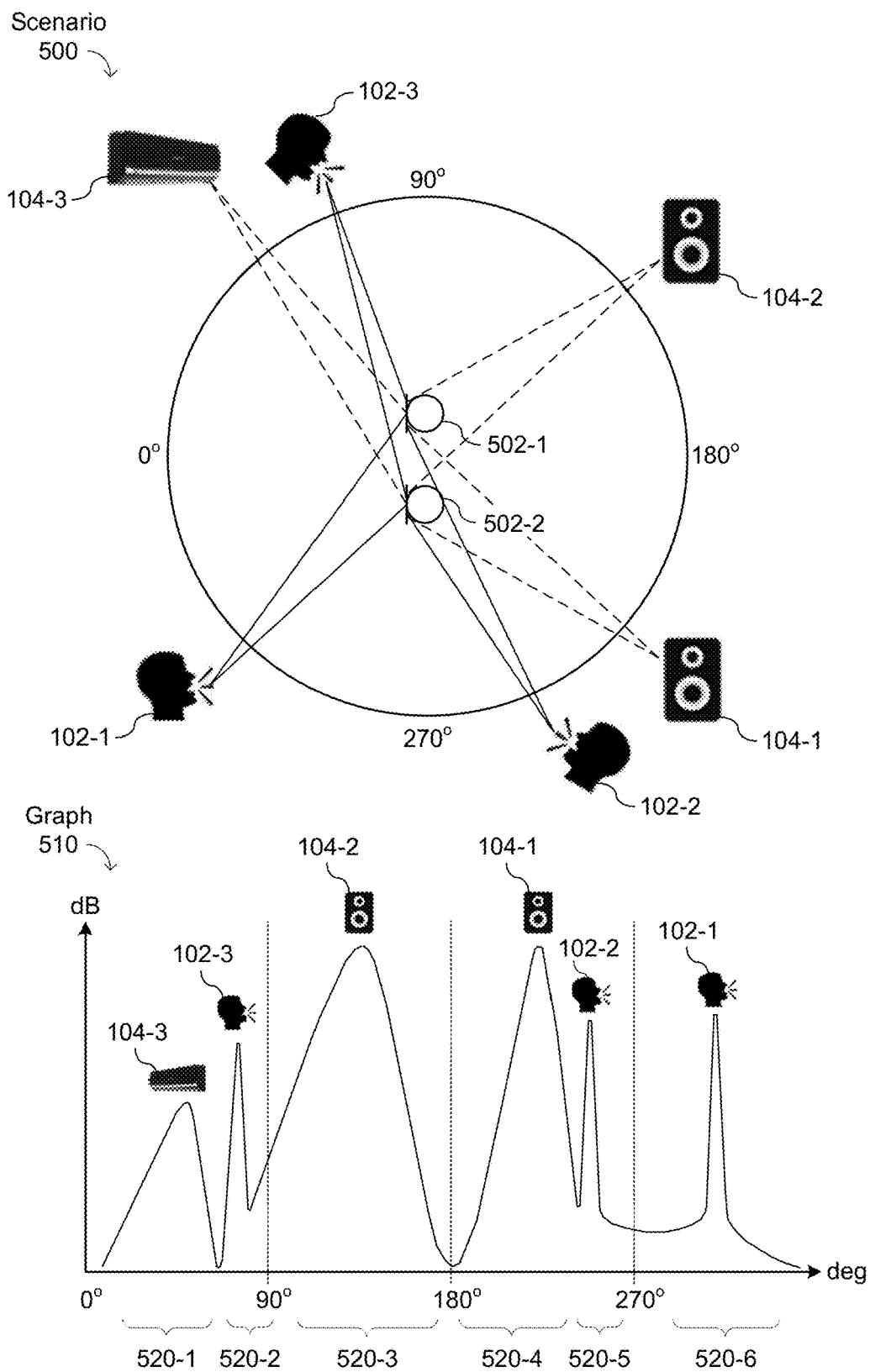
FIG. 5 illustrates an example source extraction technique in accordance with some embodiments.

FIG. 5 illustrates the assignment and detection operations (306 and 308) in accordance with some embodiments. In an example scenario 500, a plurality of voice-based audio sources 102 and non voice-based audio sources 104 are distributed around a voice-controlled device (represented by two microphones 502) in an environment. As a result of the scanning and audio source detection operations (302 and 304), the audio processing module obtains a volume distribution graph 510 representing each of the six audio sources. The audio processing module 204 dynamically assigns six angular sections (520-1 through 520-6) to six WWEs (220-1 through 220-6). As part of this assignment operation, each WWE receives a delayed and summed audio signal representative of an aligned sound wave associated with each audio source, and each WWE performs wake word detection operations on its respective audio signal to determine whether it includes, represents, or is otherwise associated with a wake word.

Figure 8:
FIG. 8 illustrates a detection sensitivity threshold spectrum in accordance with some embodiments.

Each WWE performs wake word detection based on a sensitivity threshold. FIG. 8 illustrates an example sensitivity threshold spectrum 800. A strict threshold requires a detected wake word or phrase to include each vocal component of the word or phrase (e.g., each word, syllable, and/or letter, such as "Hey Spotify"). As the threshold gets leaner, more variance is allowed in wake word detections (e.g., missing words, syllables, and/or letters, such as "Hi Spotify," "Spotify," "Spotif," "Spo-fy," "Potify," "Heyspo," and so forth). Stated another way, the sensitivity threshold indicates how distinct the pronunciation of the wake word must be in order to be detected. Lean thresholds (e.g., lower bar for detections) are typically used for sections of the environment in which people are likely to utter a wake word (e.g., 106 in FIG. 1) and sections of the environment in which there is a history of wake word detections (i.e., high probability of wake word detections). Strict thresholds (e.g., higher bar for detections) are typically used for sections of the environment in which people are unlikely to utter a wake word (e.g., 108 in FIG. 1) and sections of the environment in which there is no history of wake word detections (i.e., low probability of wake word detections).

Returning to the detection process 300 in FIG. 3, once a particular WWE detects a wake word, that WWE feeds back detection data to the AFE 210 (e.g., to source extraction module 216) where the sensitivity threshold module 260 adjusts (310) the sensitivity thresholds 224 corresponding to one or more WWEs and/or the sensitivity thresholds 252 corresponding to one or more angular sections for DAS module 250 operations. See, for example, feedback 226 from the second WWE 220-2 (FIGS. 2A and 2B). The detection data includes an indicator of a positive wake word detection at a particular WWE. The sensitivity threshold module 260 determines which angular section of the environment the wake word came from based on which WWE detected the wake word, which is in turn based on the mapping of WWEs to angular sections during the assignment operation 306 (see, for example, mapped sections 520 in FIG. 5). For example, referring to FIGS. 2A and 2B, when the AFE 210 receives feedback 226 including an indicator of a positive wake word detection from WWE 220-2, the sensitivity threshold module 260 determines that the wake word came from an audio source in the angular section associated with WWE 220-2 (e.g., 520-2 in FIG. 5, including voice-based audio source 102-3).

As part of the adjusting operation 310, the AFE 210 (e.g., sensitivity threshold module 260) sends instructions including new sensitivity thresholds to one or more of the WWEs with the purpose of adjusting the wake word acceptance tolerances (e.g., by making the thresholds more strict or more lean as described above with reference to FIG. 8). The sensitivity threshold adjustments affect the sensitivity of the detection system 120 in subsequent wake word detection operations.

In some embodiments, the sensitivity threshold module 260 adjusts sensitivity thresholds based in part on historical detection data. To this end, referring to FIGS. 2B and 6, the sensitivity threshold module 260 stores a log of historical detection data in a high probability data structure 262 (for wake word detections) and a low probability data structure 264 (for non-wake word detections). Each entry in the data structures includes the source of the detection (e.g., the angular section of the environment in which the detection occurred). In some embodiments, the data structures are implemented as last-in-first-out (LIFO) data structures.

Figure 6:
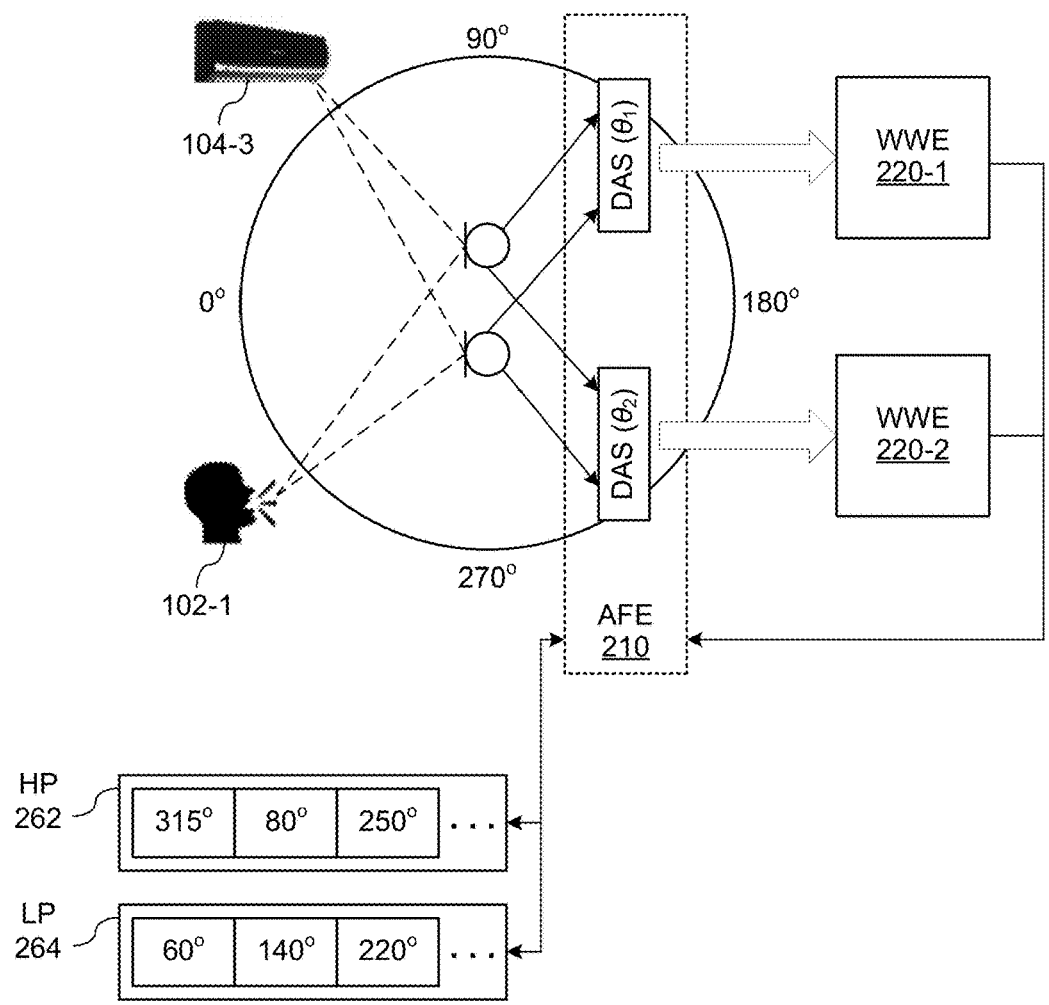
FIG. 6 illustrates an example wake word detection technique in accordance with some embodiments.

An example historical data structure scheme is depicted in scenario 600 as shown in FIG. 6. In this scenario, two audio sources are detected in the environment—a voice-based audio source 102-1 and a non voice-based audio source (noise) 104-3. The AFE 210 detects each audio source using the DAS operations described above, and the aligned audio signals corresponding to each source are transmitted to separate WWEs 220. Each WWE sends feedback to the AFE 210. WWE 220-1 sends feedback indicating a non-wake word detection associated with angle of incidence $\theta=60°$, and WWE 220-2 sends feedback indicating a wake word detection associated with angle of incidence $\theta=315°$. The sensitivity threshold module 260 adds the 60° non-wake word detection to the low probability log 264, and the 315° wake word detection to the high probability log 262.

The historical detection data stored in logs 262 and 264 can be used for a variety of applications. For instance, if the number of detected audio sources is greater than the number of available WWEs, audio sources close to high probability areas of the environment can be given precedence in the assignment of WWEs to analyze the audio signals for the presence of wake words. Stated another way, scanning and detection operations in high probability areas can be prioritized over those in low probability areas.

The historical detection data in logs 262 and 264 may additionally or alternatively be used to shape the angular sections (e.g., sections 520, FIG. 5). Specifically, the source extraction module 216 may determine the size of each angular section based on how many high probability and/or low probability logs are included in each section. If an area of the environment includes multiple wake word detections, the source extraction module 216 may assign a greater number of sections to that area, with each section being smaller so as to provide for higher resolution detection results. On the other hand, if an area of the environment includes multiple non-wake word detections, or is associated with relatively few detections, the source extraction module 216 may assign a smaller number of sections, or only one section, or no sections, to that area.

In addition to detection type data (wake word detection vs. non-wake word detection) and space data (angular section associated with each detection), the historical detection data in logs 262 and 264 may also include time data (a timestamp associated with each detection). By tracking detection times, the source extraction module 216 can account for user habits and other time-based behavior patterns. The source extraction module 216 can account for such behavior patterns by adjusting sensitivity thresholds on a spatial and temporal basis. For example, based on historical detection data, the source extraction module 216 may determine that wake words detections in an angular section of the environment including the kitchen at 2:00 AM are very unlikely, whereas wake word detections in an angular section of the environment including a couch in view of a television at 2:00 AM are somewhat more likely, whereas wake word detections in an angular section of the environment including the couch at 9:00 PM are very likely, and wake word detections in an angular section of the environment including the television at 9:00 PM are very unlikely (because the television may be determined to likely be on at that time, and the television is a non voice-based audio source). In addition to time of day information, the temporal data may also include day, week, and/or month information.

In some embodiments, the source extraction module 216 uses historical detection data to determine probabilities of wake word detections in various sections of the environment. The sensitivity threshold module 260 uses those probabilities to adjust sensitivity thresholds. For instance, if the probability that a wake word will be detected in a particular area (and in some cases, at a particular time) is high, the threshold may be adjusted so that it is leaner, whereas if the probability that a wake word will be detected in a particular area (and/or time) is low, the threshold may be adjusted so that it is more strict.

The source extraction module 216 may use statistic inference and/or machine learning techniques (e.g., Bayesian inference) on spherical distributions (e.g., Von Mises (vM) distributions) to model detection probabilities based on the historical detection data in accordance with some embodiments. Without loss of generality, this disclosure describes vM distributions as the object of inference for illustrative purposes; other types of distributions may be used in addition or as alternatives (e.g., wrapped distributions, Matrix Bingham distribution, Fisher distribution, non-parametric distributions over a hypersphere, and so forth).

Figure 7A:
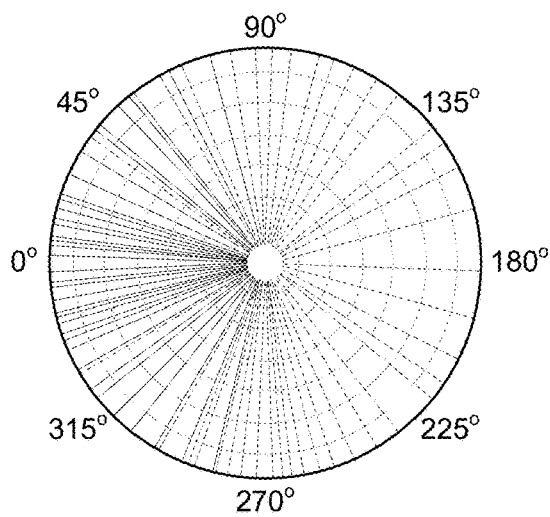
FIGS. 7A-7C illustrate an example wake word detection probability model in accordance with some embodiments.

FIG. 7A illustrates a vM distribution of an environment 100. From a voice-controlled device in the middle of the circle, solid lines represent the direction of historical wake word detections, and dashed lines represent the direction of historical non-wake word detections (noise). In this example, the probability of a wake word detection in the angular section of the environment bounded by 300° and 60° appears to be relatively higher than the probability of a wake word detection in other angular sections of the environment. When additional detections are fed back from the WWEs, the distribution is updated. Each detection is associated with a direction having an azimuth (a radian or degree on the circle).

Figure 7B:
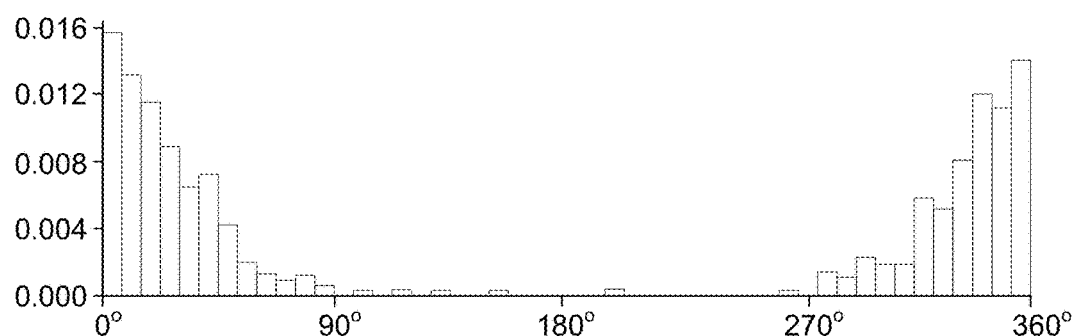
Figure 7C:
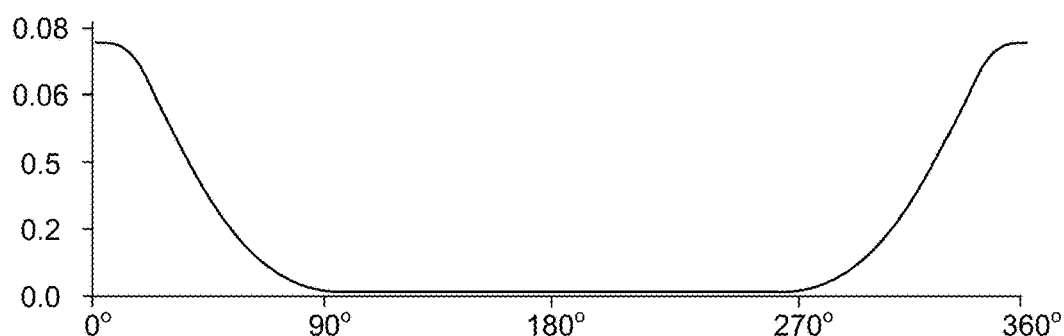

FIGS. 7B and 7C show a bar graph and a line graph, respectively, of the vM distribution depicted in FIG. 7A. From the distribution information, the source extraction module 216 may determine likelihoods of wake word detections in each section of the environment. The vM distribution of wake word detections has a mean $\mu$ and a variance $(1/k)$. The mean represents the focal point of where most detections come from, and the variance describes how big the distribution is. Another way to describe the size of the distribution is by concentration k. Note that in the case of vM, k is a concentration and $1/k$ is the dispersion (analogous to the variance). This disclosure uses the term "variance" and k throughout to represent this concept without highlighting the distinction. If there is no historical detection data, the mean and variance are both 0 (representing a uniform probability of a detection around the whole circle). Given that the detection data follow a vM distribution, the observed detections can be used as a basis to learn first and second moments, and in the case of vM, a mean and a variance of the wake word detections. The addition of new detections allows the mean and variance to be incrementally updated.

One approach to determining the mean and variance of the vM distribution of detection data involves the use of Bayesian inference (referred to herein as the "Bayesian approach"). Using the Bayesian approach, the source extraction module 216 sets initial, uniformed values for the mean and variance, samples posterior values for the mean and variance and passes them to the vM distribution. The source extraction module 216 checks the likelihood of observing detection data from the resultant vM distribution and resamples posterior values for the mean and variance until there is convergence. The source extraction module 216 uses maximum a posterior (MAP) probability estimates of the mean and variance for an actual vM distribution, and subsequent azimuths are passed to this distribution in order to determine the probability that a given detection is a wake word. Using this approach, given a distribution of the mean and a distribution of the variance, ranges of mean and variance values which are most likely to produce the distributions are determined.

Another approach to determining the mean and variance of the vM distribution of detection data involves the use of maximum likelihood estimates (MLE) for the mean and variance. The source extraction module 216 provides the MLE for the mean and variance given observed directions by clustering on the unit hypersphere. More specifically, data from a normal distribution is summed up and divided by the empirical average, resulting in the MLE of the mean. Data from a vM distribution may also be summed up and divided by the empirical average, resulting in the MLE of the mean.

In some embodiments, a combination of approaches, including one or both of the above approaches, is used to determine the mean and variance of the vM distribution of detection data. For example, using recent detection data, the source extraction module 216 may determine empirical estimates of the mean and variance using the MLE approach. Upon estimating the mean and variance, the source extraction module 216 may proceed with a Bayesian inference scheme such as a Markov chain Monte Carlo (MCMC) method for determining the mean and variance. The combination of approaches may be used in sequence as described in this paragraph. Additionally or alternatively, the combination of approaches may be used in parallel (e.g., MLE and Bayesian approaches both used to determine mean and variance values), with the values from each approach being compared to each other.

The following is a more detailed discussion of the probability calculations used by the source extraction module 216 in accordance with some embodiments.

As noise hits the microphone array there is a known direction of arrival (DOA). Given a DOA in radians d, the source extraction module 216 must determine the probability that a signal from that DOA is a valid wake word.

Let the random variable S represent any sound signal observed in the environment $s_1 \ldots s_m$. Moreover let θ be the random variable that represents the DOA of valid wake word detections, $\theta_1 \ldots \theta_m$. Radian observations treated as a random variable on a circle are modeled probabilistically by a vM distribution (a normal distribution on a 2-D circle). Samples from the distribution are bounded from (−π, π).

The distribution is parameterized by mean and variance (μ, k). Given a parameterization (θ|μ, k) the probability density function (PDF) of the vM distribution is used to determine the probability of observing a given DOA:

$$M(\theta \mid \mu, k) = \frac{e^{k \cos(\mu - \theta)}}{2\pi I_0(k)}$$

The source extraction module 216 must find (μ, k) of the valid wake word DOA distribution so that it can, using the PDF, determine the probability of a wake word from any given azimuth.

In some embodiments, the source extraction module 216 maintains two sets of parameters per user: (i) face parameters which are used for inference, and (ii) revamp parameters which are updated per incidence of a valid wake word detection. Stated another way, the face parameters are stable parameters serving user needs, while the revamp parameters are constantly updating with each wake word detection. After t incidents of valid wake word detections, the current revamp parameters are promoted to face parameters. The variable t represents the detection system's adaptive sensitivity to new wake works and does not need to be constant. For example, early on the source extraction module 216 may make t large, requiring many examples before face parameters are replaced by revamp parameters. Then as usage increases, the source extraction module 216 may replace the face parameters more frequently.

In some embodiments, the initial face parameters are set to (0, 0), resulting in a uniform probability of a valid wake word from any direction. The revamp parameters are set to null.

Based on the values of θ observed to date, the source extraction module 216 can calculate a point value for (μ, k) using a closed form solution that produces estimates of each. These estimates of (μ, k) are the maximum likelihood estimates (MLE) (the values of each parameter that maximize the likelihood of observing the real data from the distribution in question). This results in a point value estimate of each and can be extremely sensitive to swings in the data.

In addition to learning the revamp parameters as single values, the source extraction module 216 may also learn the parameters of another distribution from which it can sample possible values of (μ, k) respectively. This distribution (one for each) is known in Bayesian inference as the posterior distribution. To do this, the source extraction module 216 uses an inference algorithm to explore the posterior distributions for each and check the azimuth probability from a vM distribution parameterized with these propositions against the actual detection data. Other inference algorithms may be used, and use of the Bayesian approach as described above is not meant to be limiting.

In some embodiments, the source extraction module 216 seeds the above algorithms with initial guesses of (μ, k) as well as with a reasonable guess of the distributions from which (μ, k) are generated. The initial propositions can be obtained via the maximum likelihood estimates. The initial generative distributions are known as priors. In some embodiments, priors may be picked such that, with no learning, (μ, k) are near 0 and thus azimuth probabilities from the vM are uniform.

As the source extraction module 216 samples potential parameters from the posterior distributions, the source extraction module 216 can average them and use the MAP estimate or the Bayes Action to coalesce the posterior samples into parameters to the DOA distribution.

In addition to using the MLEs to seed the MCMC chain (as described above), the source extraction module 216 can also query a distribution parameterized by the MLEs themselves (DOA-MLE), query the one parameterized by the Bayesian result (DOA-BAYES) and average or use a voting scheme with the resulting probabilities. The source extraction module 216 can incrementally update both parameter sets given each successive wake word detection, maintain short term and long term parameter settings based on user behavior, and/or optionally train the detection to be multimodal (multiple concentrations and dispersions for distinct yet consistent wake word detections).

As discussed above, the source extraction module 216 may maintain two different sets of parameters to make mean and variance inferences—face parameters and revamp parameters. The face parameters are the stable parameters, and the revamp parameters dynamically update based on new observations. Every so often, the source extraction module 216 replaces the current parameters facing the user (the face parameters) with the parameters that have been involved in learning (the revamp parameters). For example, the source extraction module 216 may use the MLE estimates for a first number of wake word detections (e.g., the first 10 wake word detections). Then the source extraction module 216 may use the MLE estimates as face parameters, while continuing to update the MLE estimates as revamp parameters. In some embodiments, the face parameters and the revamp parameters are averaged (or combined in any other way), and the source extraction module 216 uses the average (or combination) of the two parameter sets as the final mean and variance values.

In some embodiments, the source extraction module 216 determines vM distributions for different points in time. This can be done with a relatively complicated multivariate approach, where time is variable. Alternatively, time-based determinations may be simplified by determining, at any given point in time, where the wake word detections are coming from (accounting for historical detection data), and basing the vM distribution on the historical detection data. For example, the vM distribution may be based on a number of recent detections (e.g., the last 20 detections), and/or by using a short term distribution (e.g., 3 days) and a long term distribution (e.g., 2 months). The use of short term and long term distributions account for scenarios in which the voice-controlled device is moved (e.g., during cleaning). In such scenarios, the short term history is used to learn detection probabilities in the new location, while the history of detection probabilities from the original location is not forgotten and can still be useful if the device is moved back to the original location.

In some embodiments, the source extraction module 216 determines vM distributions for different users. For users who move the voice-controlled device or frequently change query positions (e.g., a user who stands in different areas of the room while uttering wake words and voice commands), the mean and variance will be closer to (0, 0). For users who usually make queries in the same location, however, the mean and variance will be optimized based on the historical detection data for that user.

Returning to the detection process 300 in FIG. 3, upon determining adjustments for the detection thresholds based on one or more of the techniques described above, the source extraction module 216 communicates the new sensitivity thresholds 224 to one or more of the WWEs, and the wake word detection operation 308 repeats with the new sensitivity thresholds 224 for subsequent detections.

In some embodiments, as part of the wake word detection operation 308, a WWE which has detected a wake word uses (308A) audio signals associated with other angular sections for reference during the current and/or subsequent detection operations. Stated another way, WWEs that are associated with angular sections of the environment which are unlikely to detect wake words, or are otherwise determined to have not detected a wake word, output audio signals (e.g., 408, FIGS. 4A-4C) to the AFE 210 for further noise cancelation. In these instances, the audio signals outputted by WWEs which do not include wake words can be considered noise, and can be used as reference channels in noise cancelation operations. For example, upon detection of a wake word in a particular angular section (e.g., 520-2, FIG. 5), the audio processing module 204 uses audio signals from one or more of the other angular sections (e.g., 520-1 and 520-3 through 520-6) to cancel or subtract audio signals detected by the particular angular section which is detecting or has detected the wake word. This improves the quality of the audio signal including the wake word, which in turn allows for improved (i.e., higher quality) audio signals to be supplied to the particular WWE for subsequent detections. Since it is unlikely that one person will say a wake word and another person in another area of the environment will utter a voice command or another wake word, the angular sections not associated with a wake word detection can be inferred to be noise for purposes of noise cancelation. In some embodiments, one or more of the angular sections stored in the low probability log 264 may be used for noise cancelation operations as described in this paragraph.

Returning to the detection process 300 in FIG. 3, in some embodiments, upon detection of a wake word, the audio processing module 204 focuses (312) on the angular section associated with the wake word detection until the end of an interaction with the user who uttered the wake word. The interaction includes a wake word, one or more voice commands, and one or more responses to the one or more voice commands. As described above, the voice service 230, in some embodiments, outputs an end of speech (EOS) signal upon detection of the completion of the interaction (e.g., a voice command is understood, a response is issued, and no further voice commands are received within a threshold of time). For example, when a wake word is detected in a particular angular section (e.g., 520-2, FIG. 5), the AFE 210 provides audio signals from that section to the voice service 230 until the voice service 230 feeds back an EOS signal. By focusing on the particular angular section associated with the latest wake word detection, the AFE 210 avoids providing lower quality audio signals to the voice service 230 in the event a different WWE detects a wake word, since wake word detections in the middle of an interaction can be inferred to be false positives. As such, upon detection of a wake word, the AFE 210 ignores feedback 226 from the WWEs until an EOS signal is received from the voice service 230.

In some embodiments, the detection modules 222 of the WWEs 220 are configured to detect more than one wake word. For example, if the voice-controlled device 110 implements a plurality of assistant services, each service may be configured to activate by a unique wake word or set of wake words. For embodiments involving multiple wake words, detection feedback 226 may not include the identity of the specific wake word. That way, wake word detections contribute equally to the probability models described above with reference to FIGS. 7A-7C, regardless of the identity of the wake word. Separate probability histograms are not required for each different wake word. As such, in some embodiments, assuming user interaction habits (both spatial and temporal) are unaffected by the identity of the wake word used to interact with the voice-controlled device 110, the same detection probabilities are applied for all wake words.

In some embodiments, certain types of voice commands may be associated with detection probabilities which are based on the voice command type. For example, a voice command requesting a playlist may correspond to a high probability of wake word detections in a first angular section of the environment (e.g., the user usually asks for playlists from the entrance of the room), and a voice command requesting a particular song may correspond to a high probability of wake word detections in a second angular section of the environment, different from the first (e.g., the user usually asks for individual songs from the couch). Moreover, certain types of interactions may be associated with detection probabilities which are based on the interaction type. For example, interactions including weather and news requests may correspond to a high probability of wake word detections in a first angular section of the environment (e.g., the user usually asks for weather and news from the bathroom sink), and interactions including the setting of light levels and wake up alarms may correspond to a high probability of wake word detections in a second angular section of the environment, different from the first (e.g., the user usually sets an alarm and turns off the lights from the bed).

In these scenarios, the voice service 230 may be configured to determine which voice-controlled service of a plurality of voice-controlled services implemented in the device 110 is invoked, based in part on the source of the wake word associated with the voice command or interaction. This is helpful for scenarios in which different voice-controlled services may respond to the same or similar voice commands, or when the same voice-controlled service may respond to the same voice command in different ways. For example, if two voice-controlled services have a response for a command to set an alarm, source data (i.e., where the command came from) can be used by the audio processing module 204 or by the voice service 230 to differentiate which voice-controlled service to transmit the voice command to. In this example, if the command came from the bed, a voice-controlled service for interacting with an alarm clock would be invoked, and if the command came from the kitchen, a voice-controlled service for interacting with a cooking alarm on a stove would be invoked. As another example, if a track and a playlist have the same name, a voice command including a request to play that particular name may trigger the playlist if the command (or corresponding wake word) came from an area of the room with a high probability of playlist commands being issued, or the name may trigger the track if the command (or corresponding wake word) came from an area of the room with a high probability of song commands being issued. In these scenarios, each type of interaction or voice command would be associated with different distributions in the probability histogram as described above with reference to FIGS. 7A-7C.

What is claimed is:

1. A method, comprising:
at an electronic voice-controlled speaker device including an audio front end system having a microphone array, one or more processors, and memory storing instructions for execution by the one or more processors:
    detecting, from the microphone array, an audio signal in an environment proximate to the audio front end system;
    identifying a first spatial zone of a plurality of spatial zones in the environment as a first source of audio associated with the audio signal;
    assigning a first wake word detection engine of a plurality of wake word detection engines to the first spatial zone in accordance with the identifying of the first spatial zone as a first source of audio;
    identifying a second spatial zone of the plurality of spatial zones in the environment as a second source of audio associated with the audio signal, wherein the second spatial zone is different from the first spatial zone;
    assigning a second wake word detection engine of the plurality of wake word detection engines to the second spatial zone in accordance with the identifying of the second spatial zone as a second source of audio;
    processing the audio signal at the first wake word detection engine assigned to the first spatial zone;
    processing the audio signal at the second wake word detection engine assigned to the second spatial zone;
    determining, based on the processing at the first wake word detection engine and based on the processing at the second wake word detection engine, whether the audio signal represents a wake word for the electronic voice-controlled speaker device; and
    in accordance with a determination that the audio signal represents a wake word for the electronic voice-controlled speaker device, adjusting a wake word detection threshold for at least one of the first wake word detection engine and the second wake word detection engine.

2. The method of claim 1, wherein:
identifying the first spatial zone comprises aligning first component sound waves of the audio signal detected from the first source of audio;
identifying the second spatial zone comprises aligning second component sound waves of the audio signal detected from the second source of audio;
processing the audio signal at the first wake word detection engine comprises performing a wake word detection process on the aligned first component sound waves; and
processing the audio signal at the second wake word detection engine comprises performing a wake word detection process on the aligned second component sound waves.

3. The method of claim 2, wherein:
determining whether the audio signal represents a wake word for the electronic voice-controlled speaker device comprises applying a noise cancelation process at the first wake word detection engine based on the processing of the audio signal at the second wake word detection engine.

4. The method of claim 2, wherein:
adjusting the wake word detection threshold comprises adjusting a wake word detection threshold associated with the second wake word detection engine based on a determination by the first wake word detection engine that the audio signal represents a wake word for the electronic voice-controlled speaker device.

5. The method of claim 4, wherein:
adjusting the wake word detection threshold associated with the second wake word detection engine comprises increasing the wake word detection threshold for the second wake word detection engine on a spectrum of strictness.

6. The method of claim 1, further comprising:
identifying a third spatial zone of the plurality of spatial zones in the environment as a third source of audio associated with the audio signal, wherein the third spatial zone is different from the first and second spatial zones;
causing a third wake word detection engine to be made available for processing the audio signal; and
assigning the third wake word detection engine to the third spatial zone.

7. The method of claim 6, wherein causing the third wake word detection engine to be made available for processing the audio signal comprises:
dynamically adjusting how many wake word detection engines are available for processing the audio signal.

8. The method of claim 1, wherein:
the wake word detection threshold is used in subsequent processing of audio signals at the first wake word detection engine, and corresponds with a probability that the audio signal represents a wake word.

9. The method of claim 1, wherein adjusting the wake word detection threshold comprises adjusting the wake word detection threshold based on a spatial model of the environment representing locations and probabilities of wake word source zones.

10. The method of claim 9, wherein the spatial model is based on a Bayesian inference analysis using a probability distribution to determine the probability of detecting a valid wake word.

11. The method of claim 1, further comprising:
configuring the audio front end system to detect subsequent audio signals from a direction associated with a spatial zone corresponding with the determination that the audio signal represents a wake word for the electronic voice-controlled speaker device; and
maintaining the audio front end configuration until the electronic voice-controlled speaker device receives an end of speech feedback signal from a distinct voice service process.

12. An electronic voice-controlled speaker device including an audio front end system having a microphone array, one or more processors, and memory storing one or more programs to be executed by the one or more processors, the one or more programs including instructions for:
    detecting, from the microphone array, an audio signal in an environment proximate to the audio front end system;
    identifying a first spatial zone of a plurality of spatial zones in the environment as a first source of audio associated with the audio signal;
    assigning a first wake word detection engine of a plurality of wake word detection engines to the first spatial zone in accordance with the identifying of the first spatial zone as a first source of audio;

identifying a second spatial zone of the plurality of spatial zones in the environment as a second source of audio associated with the audio signal, wherein the second spatial zone is different from the first spatial zone;

assigning a second wake word detection engine of the plurality of wake word detection engines to the second spatial zone in accordance with the identifying of the second spatial zone as a second source of audio;

processing the audio signal at the first wake word detection engine assigned to the first spatial zone;

processing the audio signal at the second wake word detection engine assigned to the second spatial zone;

determining, based on the processing at the first wake word detection engine and based on the processing at the second wake word detection engine, whether the audio signal represents a wake word for the electronic voice-controlled speaker device; and in accordance with a determination that the audio signal represents a wake word for the electronic voice-controlled speaker device, adjusting a wake word detection threshold for at least one of the first wake word detection engine and the second wake word detection engine.

13. The electronic voice-controlled speaker device of claim 12, wherein the instructions for:

identifying the first spatial zone include instructions for aligning first component sound waves of the audio signal detected from the first source of audio;

identifying the second spatial zone include instructions for aligning second component sound waves of the audio signal detected from the second source of audio;

processing the audio signal at the first wake word detection engine include instructions for performing a wake word detection process on the aligned first component sound waves; and processing the audio signal at the second wake word detection engine include instructions for performing a wake word detection process on the aligned second component sound waves.

14. The electronic voice-controlled speaker device of claim 13, wherein the instructions for:

determining whether the audio signal represents a wake word for the electronic voice-controlled speaker device include instructions for applying a noise cancelation process at the first wake word detection engine based on the processing of the audio signal at the second wake word detection engine.

15. The electronic voice-controlled speaker device of claim 13, wherein the instructions for:

adjusting the wake word detection threshold include instructions for adjusting a wake word detection threshold associated with the second wake word detection engine based on a determination by the first wake word detection engine that the audio signal represents a wake word for the electronic voice-controlled speaker device.

16. The electronic voice-controlled speaker device of claim 15, wherein the instructions for:

adjusting the wake word detection threshold associated with the second wake word detection engine include instructions for increasing the wake word detection threshold for the second wake word detection engine on a spectrum of strictness.

17. A non-transitory computer readable storage medium storing one or more programs configured for execution by an electronic voice-controlled speaker device including an audio front end system having a microphone array, the one or more programs including instructions for:

detecting, from the microphone array, an audio signal in an environment proximate to the audio front end system;

identifying a first spatial zone of a plurality of spatial zones in the environment as a first source of audio associated with the audio signal;

assigning a first wake word detection engine of a plurality of wake word detection engines to the first spatial zone in accordance with the identifying of the first spatial zone as a first source of audio;

identifying a second spatial zone of the plurality of spatial zones in the environment as a second source of audio associated with the audio signal, wherein the second spatial zone is different from the first spatial zone;

assigning a second wake word detection engine of the plurality of wake word detection engines to the second spatial zone in accordance with the identifying of the second spatial zone as a second source of audio;

processing the audio signal at the first wake word detection engine;

processing the audio signal at the second wake word detection engine;

determining, based on the processing at the first wake word detection engine and based on the processing at the second wake word detection engine, whether the audio signal represents a wake word for the electronic voice-controlled speaker device; and in accordance with a determination that the audio signal represents a wake word for the electronic voice-controlled speaker device, adjusting a wake word detection threshold for at least one of the first wake word detection engine and the second wake word detection engine.

18. The non-transitory computer readable storage medium of claim 17, wherein the instructions for:

identifying the first spatial zone include instructions for aligning first component sound waves of the audio signal detected from the first source of audio;

identifying the second spatial zone include instructions for aligning second component sound waves of the audio signal detected from the second source of audio;

processing the audio signal at the first wake word detection engine include instructions for performing a wake word detection process on the aligned first component sound waves; and processing the audio signal at the second wake word detection engine include instructions for performing a wake word detection process on the aligned second component sound waves.

19. The non-transitory computer readable storage medium of claim 18, wherein the instructions for:

determining whether the audio signal represents a wake word for the electronic voice-controlled speaker device include instructions for applying a noise cancelation process at the first wake word detection engine based on the processing of the audio signal at the second wake word detection engine.

20. The non-transitory computer readable storage medium of claim 18, wherein the instructions for:

adjusting the wake word detection threshold include instructions for adjusting a wake word detection threshold associated with the second wake word detection engine based on a determination by the first wake word detection engine that the audio signal represents a wake word for the electronic voice-controlled speaker device.

\* \* \* \* \*